(12) United States Patent
Zhang et al.

(10) Patent No.: US 9,224,374 B2
(45) Date of Patent: Dec. 29, 2015

(54) METHODS AND DEVICES FOR AUDIO PROCESSING

(71) Applicant: Xiaomi Inc., Beijing (CN)

(72) Inventors: Pengfei Zhang, Beijing (CN); Zhenyu Yang, Beijing (CN); Xiao Zhang, Beijing (CN); Xingsheng Lin, Beijing (CN)

(73) Assignee: Xiaomi Inc., Beijing (CN)

( * ) Notice: Subject to any disclaimer, the term of this patent is extended or adjusted under 35 U.S.C. 154(b) by 28 days.

(21) Appl. No.: 14/296,801

(22) Filed: Jun. 5, 2014

(65) Prior Publication Data

US 2014/0358566 A1  Dec. 4, 2014

Related U.S. Application Data

(63) Continuation of application No. PCT/CN2014/072300, filed on Feb. 20, 2014.

(30) Foreign Application Priority Data

May 30, 2013 (CN) .......................... 2013 1 0210338

(51) Int. Cl.
| | |
|---|---|
| *G10L 19/008* | (2013.01) |
| *G10H 1/00* | (2006.01) |
| *G11B 27/00* | (2006.01) |
| *G11B 27/031* | (2006.01) |
| *G11B 27/10* | (2006.01) |
| *G10H 1/40* | (2006.01) |

(Continued)

(52) U.S. Cl.
CPC ................ *G10H 1/00* (2013.01); *G10L 19/008* (2013.01); *G11B 27/00* (2013.01); *G11B 27/031* (2013.01); *G11B 27/10* (2013.01); *G10H 1/368* (2013.01); *G10H 1/38* (2013.01); *G10H 1/40* (2013.01)

(58) Field of Classification Search
CPC ........... G10H 1/00; G10H 1/368; G10H 1/38; G10H 1/40; G11B 27/00; G11B 27/031; G11B 27/10
See application file for complete search history.

(56) References Cited

U.S. PATENT DOCUMENTS

| | | | |
|---|---|---|---|
| 5,235,124 A | 8/1993 | Okamura et al. | |
| 5,499,922 A * | 3/1996 | Umeda et al. | ............. 434/307 A |

(Continued)

FOREIGN PATENT DOCUMENTS

| | | |
|---|---|---|
| CN | 101345047 | 1/2009 |
| CN | 102456340 | 5/2012 |

(Continued)

OTHER PUBLICATIONS

WIPO search report for PCT/CN2014/072300; Dec. 2014.*

(Continued)

*Primary Examiner* — Jialong He
(74) *Attorney, Agent, or Firm* — Finnegan, Henderson, Farabow, Garrett & Dunner LLP

(57) ABSTRACT

An audio processing method for use in a server, includes: receiving an audio file uploaded from a terminal that has downloaded a first accompaniment music file of a song from the server, the audio file being generated by the terminal by encoding collected audio information relating to singing a portion of the song and the first accompaniment music file; and marking an unmarked, audio mixing portion in the received audio file as a portion that has been sung, to generate a second accompaniment music file of the song.

18 Claims, 9 Drawing Sheets

(51) Int. Cl.
 *G10H 1/38* (2006.01)
 *G10H 1/36* (2006.01)

(56) References Cited

U.S. PATENT DOCUMENTS

| | | | |
|---|---|---|---|
| 5,824,935 A * | 10/1998 | Tanaka | 84/631 |
| 7,058,889 B2 * | 6/2006 | Trovato et al. | 715/716 |
| 7,853,342 B2 * | 12/2010 | Redmann | 700/94 |
| 2002/0032728 A1 * | 3/2002 | Sako et al. | 709/203 |
| 2002/0091847 A1 * | 7/2002 | Curtin | 709/231 |
| 2003/0099347 A1 * | 5/2003 | Ford et al. | 379/387.01 |
| 2003/0117531 A1 * | 6/2003 | Rovner et al. | 348/729 |
| 2003/0192424 A1 * | 10/2003 | Koike | 84/477 R |
| 2005/0120865 A1 * | 6/2005 | Tada | 84/600 |
| 2005/0252362 A1 * | 11/2005 | McHale et al. | 84/616 |
| 2006/0069562 A1 * | 3/2006 | Adams et al. | 704/251 |
| 2006/0292537 A1 * | 12/2006 | Nute et al. | 434/307 A |
| 2007/0287141 A1 * | 12/2007 | Milner | 434/307 A |
| 2008/0190271 A1 * | 8/2008 | Taub et al. | 84/645 |
| 2008/0205759 A1 * | 8/2008 | Zandifar et al. | 382/177 |
| 2009/0106429 A1 * | 4/2009 | Siegal et al. | 709/227 |
| 2009/0107320 A1 * | 4/2009 | Willacy et al. | 84/609 |
| 2009/0164034 A1 * | 6/2009 | Cohen et al. | 700/94 |
| 2009/0165634 A1 * | 7/2009 | Mahowald | 84/610 |
| 2010/0087240 A1 * | 4/2010 | Egozy et al. | 463/7 |
| 2010/0326256 A1 * | 12/2010 | Emmerson | 84/610 |
| 2011/0126103 A1 * | 5/2011 | Cohen et al. | 715/716 |
| 2011/0144983 A1 * | 6/2011 | Salazar et al. | 704/207 |
| 2011/0251841 A1 * | 10/2011 | Cook et al. | 704/207 |

FOREIGN PATENT DOCUMENTS

| | | |
|---|---|---|
| CN | 103295568 | 9/2013 |
| JP | 2005-10639 | 1/2005 |
| TW | 201228290 | 7/2012 |

OTHER PUBLICATIONS

International Search Report of PCT/CN2014/072300, mailed from the State Intellectual Property Office of China on May 6, 2014, A translation is attached.

* cited by examiner

METHODS AND DEVICES FOR AUDIO PROCESSING

CROSS REFERENCE TO RELATED APPLICATIONS

This application is a continuation of International Application No. PCT/CN2014/072300, filed Feb. 20, 2014, which is based upon and claims priority to Chinese Patent application No. 201310210338.5, filed May 30, 2013, the entire contents of all of which are incorporated herein by reference.

TECHNICAL FIELD

The present disclosure generally relates to the field of audio processing and, more particularly, to methods and devices for recording a song sung by multiple users.

BACKGROUND

A mobile terminal installed with a Karaoke application enables a user to perform Karaoke using the mobile terminal. For example, the Karaoke application can provide musical accompaniment of a song through a speaker of the mobile terminal, and display corresponding lyrics of the song synchronously on a display of the mobile terminal. Moreover, the Karaoke application may include a scoring function, which scores the user's performance and allows for the score to be shared with friends of the user.

Conventionally, the user performs Karaoke using the mobile terminal, and submits a finished song to be saved and presented by a server. Other users using this Karaoke application may then play the finished song from the server and make comments. If multiple users each want to sing a different portion of the song, the users generally need to be together and sing their respective portions of the song using the same mobile terminal, and then submit the finished song to be saved and presented by the server.

SUMMARY

According to a first aspect of the present disclosure, there is provided an audio processing method for use in a server, comprising: receiving an audio file uploaded from a terminal that has downloaded a first accompaniment music file of a song from the server, the audio file being generated by the terminal by encoding collected audio information relating to singing a portion of the song and the first accompaniment music file; and marking an unmarked, audio mixing portion in the received audio file as a portion that has been sung, to generate a second accompaniment music file of the song.

According to a second aspect of the present disclosure, there is provided an audio processing method for use in a terminal, comprising: downloading a first accompaniment music file of a song from a server; collecting audio information relating to singing a portion of the song; encoding the collected audio information and the first accompaniment music file to generate an audio file, the generated audio file including an unmarked, audio mixing portion; marking the unmarked, audio mixing portion in the audio file as a portion that has been sung; and uploading the marked audio file to the server.

According to a third aspect of the present disclosure, there is provided a server, comprising: a processor; and a memory for storing instructions executable by the processor; wherein the processor is configured to: receive an audio file uploaded from a terminal that has downloaded a first accompaniment music file of a song from the server, the audio file being generated by the terminal by encoding collected audio information relating to singing a portion of the song and the first accompaniment music file; and mark an unmarked, audio mixing portion in the received audio file as a portion that has been sung, to generate a second accompaniment music file of the song.

According to a fourth aspect of the present disclosure, there is provided a terminal, comprising: a processor; and a memory for storing instructions executable by the processor; wherein the processor is configured to: download a first accompaniment music file of a song from a server; collect audio information relating to singing a portion of the song; encode the collected audio information and the first accompaniment music file to generate an audio file, the generated audio file including an unmarked, audio mixing portion; mark the unmarked, audio mixing portion in the audio file as a portion that has been sung; and upload the marked audio file to the server.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
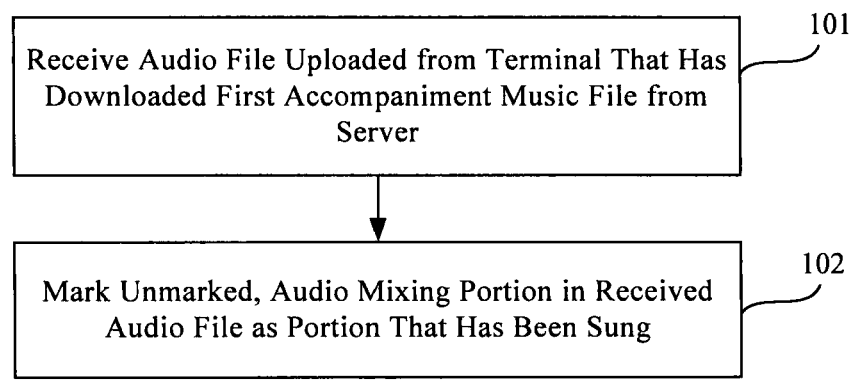
FIGS. 1-4 are flowcharts of methods for recording a song sung by multiple users, according to exemplary embodiments.

FIG. 1 is a flowchart of a method 100 for recording a song sung by multiple users using their respective terminals, according to an exemplary embodiment. Referring to FIG. 1, the method 100 includes the following steps.

In step 101, a server receives an audio file uploaded from a terminal that has downloaded a first accompaniment music file from the server.

In step 102, the server marks an unmarked, audio mixing portion in the received audio file as a portion that has been sung.

In the illustrated embodiment, when multiple users sing different portions of the same song, the singing may be performed by using terminals of the respective users, such as mobile phones, tablet computers or the like.

When a first user wants to participate in the singing, the first accompaniment music file may be downloaded from the server to the terminal of the first user. When the first user sings a first portion of the song, audio information of the first user is collected by the terminal, and an audio file corresponding to the terminal is generated by the terminal through, e.g., encoding the collected audio information and the first accompaniment music file downloaded from the server. Accordingly, the generated audio file includes an unmarked, audio mixing portion.

After the server receives the audio file uploaded from the terminal, the server marks the unmarked, audio mixing portion in the audio file as a portion that has been sung, to generate a second accompaniment music file. When a second user wants to participate in singing the song, the second accompaniment music file may be downloaded from the server to the terminal of the second user.

By repeating steps 101 and 102 of the method 100, the server enables multiple users to sing their respective portions of the song at different times and in different places. In addition, each user may sing multiple times, or process, his/her own portion independently without affecting the portions of other users.

Figure 2:
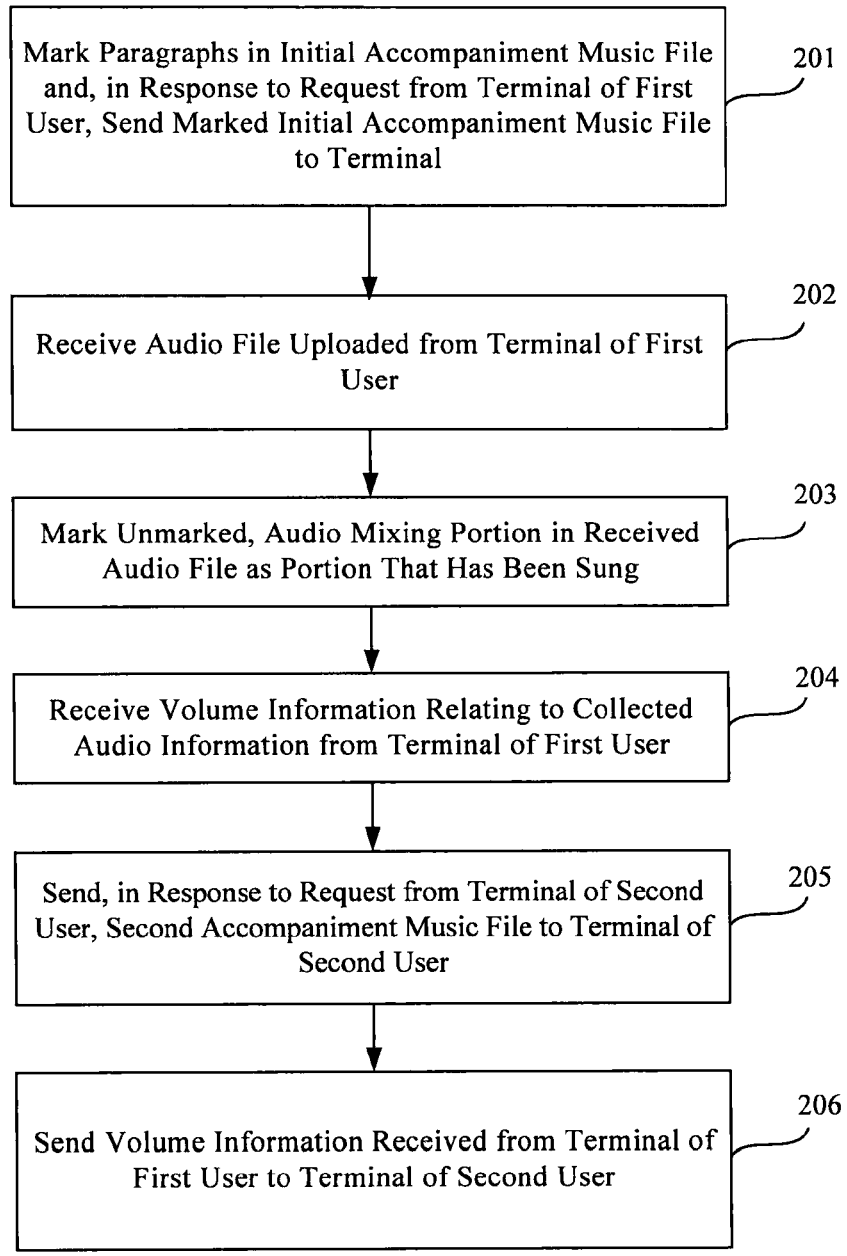

FIG. 2 is a flowchart of a method 200 for recording a song sung by multiple users using their respective terminals, according to an exemplary embodiment. Referring to FIG. 2, the method 200 includes the following steps.

In step 201, a server marks paragraphs in an initial accompaniment music file and, in response to a request from a terminal of a first user, sends the marked initial accompaniment music file to the terminal. For example, the marked initial accompaniment music file may include at least one paragraph.

In one exemplary embodiment, the server marks paragraphs in the initial accompaniment music file based on a time interval. For example, the initial accompaniment music file may include accompaniment music and lyrics of the song. The server obtains a time interval between every two successive characters of the lyrics, and compares the obtained time interval with a preset threshold value. When the obtained time interval between first and second successive characters is larger than the preset threshold value, the server marks an end of a paragraph between the first and second characters.

In exemplary embodiments, the server uses a predetermined symbol, such as a dot, to mark paragraphs for the initial accompaniment music file. For example, if the predetermined symbol is inserted between two characters, the two characters belong to two different paragraphs. Also for example, the predetermined symbol may be used to mark an end of one paragraph, or used to distinguish between different paragraphs of the initial accompaniment music file to be sung by male and female. Additionally, the initial accompaniment music file may be marked in other ways, such as using different colors for marking different paragraphs, using a tone level, such as a high level or a low level, etc. The present disclosure is not limited thereto.

In step 202, the server receives an audio file uploaded from the terminal of the first user.

In step 203, the server marks an unmarked, audio mixing portion in the received audio file as a portion that has been sung.

In the illustrated embodiment, different portions of the song may be sung by different users with their respective terminals. When a first user sings his/her portion of the song, the terminal of the first user may collect audio information of the first user, and generate the audio file by encoding the collected audio information and the initial accompaniment music file downloaded from the server. Accordingly, the generated audio file includes an unmarked, audio mixing portion.

After the server receives the audio file uploaded from the terminal, the server marks the unmarked, audio mixing portion in the audio file as a portion that has been sung. For example, the server obtains position information for the collected audio information in the audio file to identify the audio mixing portion. The server then marks the identified portion in the audio file as a portion that has been sung.

In one exemplary embodiment, to mark the audio mixing portion of the audio file, the server changes a color of a part of the lyrics corresponding to the audio mixing portion. For example, if the original color of the lyrics is black, the server can change the color of the audio mixing portion to red. In one exemplary embodiment, the server uses a name of the audio file to mark the audio mixing portion in the audio file. For example, the server may use a part of the name of the audio file to indicate which portion has been sung. In one exemplary embodiment, the server simultaneously uses the above two marking methods to mark the audio mixing portion in the audio file.

In exemplary embodiments, the server may use other methods to mark the audio mixing portion in the audio file. For example, the server may change fonts of the lyrics corresponding to the audio mixing portion.

After marking the audio mixing portion in the audio file, the server may determine the marked audio file as a second accompaniment music file. When a second user wants to participate in singing of the song, the second user may sing the song according to the second accompaniment music file.

In step 204, the server receives volume information relating to the collected audio information from the terminal of the first user. For example, when the first user performs the singing, the terminal may record the volume information, and then upload the volume information to the server.

In step 205, the server sends, in response to a request from a terminal of the second user, the second accompaniment music file to the terminal of the second user. The second user may sing another portion of the song based on a paragraph marked in the initial accompaniment music file and the marked portion in the second accompaniment music file. When the second user sings his/her portion of the song, the terminal collects audio information of the second user, and generates an audio file by encoding the collected audio information and the second accompaniment music file. The audio file is then uploaded for the server to mark the audio mixing portion of the second accompaniment music file, similar to the description in connection with FIG. 1.

In step 206, the server sends the volume information received from the terminal of the first user to the terminal of the second user. Accordingly, the terminal of the second user prompts the second user to use a same or similar volume to perform the singing. With the volume prompting, the second user may adjust the volume of his/her portion according to the volume of the first user, thereby improving performance effect.

In exemplary embodiments, steps 203-206 may be performed in different orders. For example, step 204 and step 206 may be performed before step 203 is performed. Also for example, step 203 and step 204 may be performed in parallel, and step 205 and step 206 may be performed in parallel.

Figure 3:
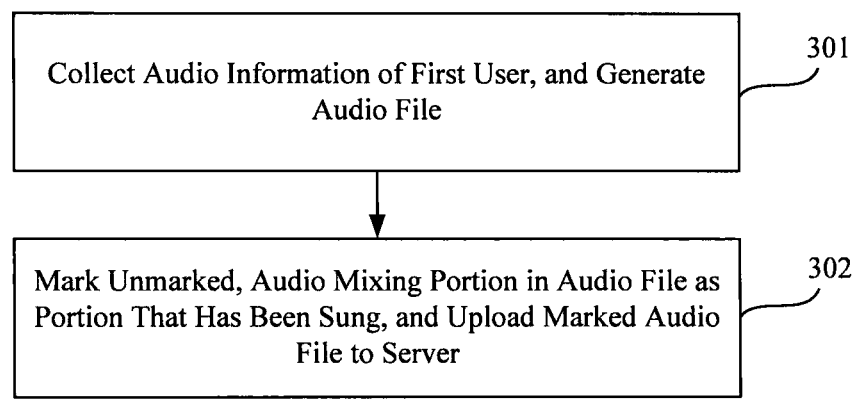

FIG. 3 is a flowchart of a method 300 for recording a song sung by multiple users using their respective terminals, according to an exemplary embodiment. For example, each of the terminals may be a mobile terminal, a tablet computer, etc. Referring to FIG. 3, the method 300 includes the following steps.

In step 301, a terminal of a first user singing a portion of the song collects audio information of the first user, and generates an audio file by encoding the collected audio information and a first accompaniment music file downloaded from a server. For example, before the first user sings, the terminal can send a request to the server, and download the first accompaniment music file from the server. The terminal may then collect the audio information when the first user sings a portion of the song, and generate the audio file. Accordingly, the generated audio file includes an unmarked, audio mixing portion.

In step 302, the terminal marks the unmarked, audio mixing portion of the audio file as a portion that has been sung, and uploads the marked audio file to the server.

After the server receives the marked audio file, the server may use the marked audio file as a second accompaniment music file. The second accompaniment music file may be downloaded from the server by a terminal of a second user that also wants to participate in singing the song. Accordingly, when terminals of respective users that want to participate in singing the song use the method 300, the users may sing their respective portions of the song at different times and in different places.

Figure 4:
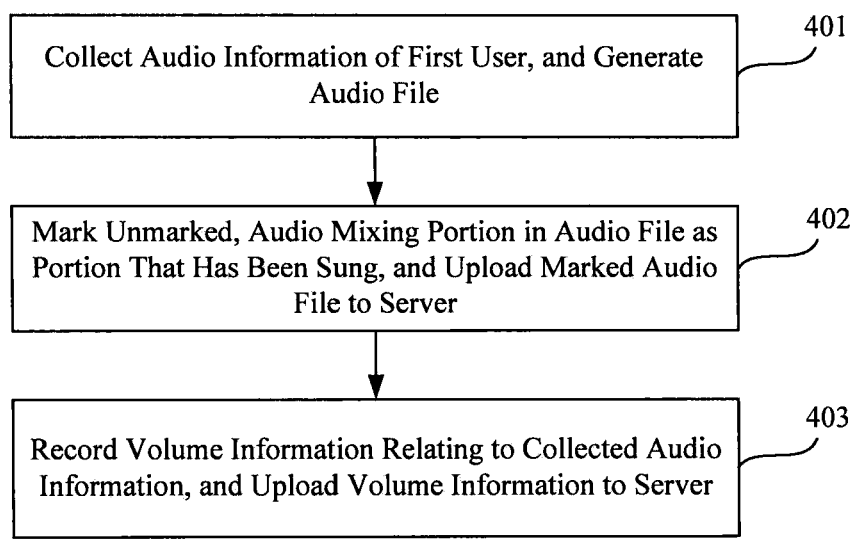

FIG. 4 is a flowchart of a method 400 for recording a song sung by multiple users using their respective terminals, according to an exemplary embodiment. For example, each of the terminals may be a mobile terminal, a tablet computer, etc. Referring to FIG. 4, the method 400 includes the following steps.

In step 401, a terminal of a first user singing a portion of the song collects audio information of the first user, and generates an audio file by encoding the collected audio information and a first accompaniment music file downloaded from a server. Accordingly, the generated audio file includes an unmarked, audio mixing portion.

In step 402, the terminal marks the unmarked, audio mixing portion of the audio file as a portion that has been sung, and uploads the marked audio file to the server.

In exemplary embodiments, to mark the audio mixing portion of the audio file, the terminal obtains position information for the collected audio information in the audio file to identify the audio mixing portion. The terminal then marks the identified portion of the audio file as the portion that has been sung.

In one exemplary embodiment, to mark the audio mixing portion of the audio file, the terminal changes a color of a part of the lyrics corresponding to the audio mixing portion, similar to the above description in connection with FIG. 2. Alternatively and/or additionally, the terminal uses a name of the audio file to mark the audio mixing portion of the audio file, also similar to the above description in connection with FIG. 2.

In step 403, the terminal records volume information relating to the collected audio information, and uploads the volume information to the server. When the server receives a request from a terminal of a second user that also wants to participate in singing the song, the server sends the second accompaniment music file and the volume information for the terminal of the second user to prompt the second user to use a same or similar volume to perform the singing.

Figure 5:
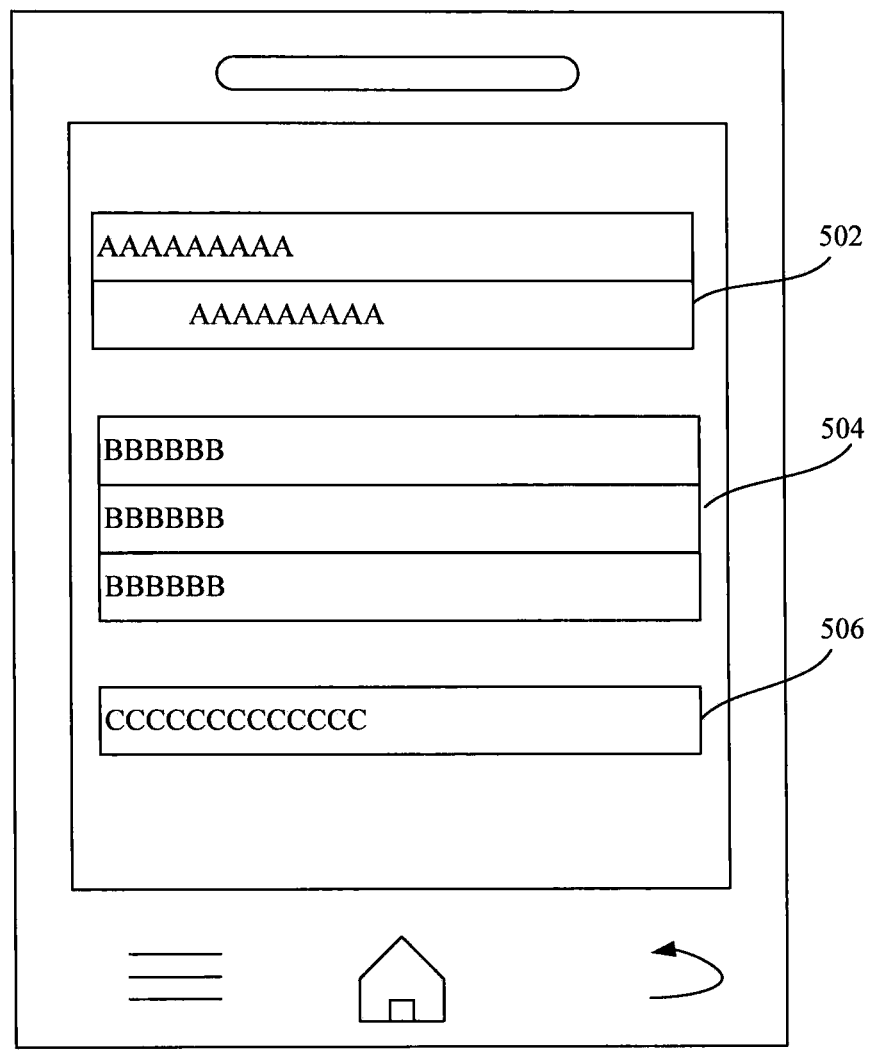
FIG. 5 is a diagram of a display interface displaying an initial accompaniment music file, according to an exemplary embodiment.

FIG. 5 is a diagram of a display interface displaying an initial accompaniment music file 500 marked by a server, according to an exemplary embodiment. Referring to FIG. 5, the marked initial accompaniment music file 500 may include a first portion 502 represented by the character A, a second portion 504 represented by the character B, and a third portion 506 represented by the character C. The portions 502, 504, and 506 may be sung by three users using different terminals, respectively. For example, the first portion 502 may be sung by a first user using a first terminal, the second portion 504 may be sung by a second user using a second terminal, and the third portion 506 may be sung by a third user using a third terminal.

In one exemplary embodiment, on the terminal side, the first terminal of the first user downloads the marked initial accompaniment music file 500 from the server and plays it, and the first user sings the portion 502. The first terminal collects audio information of the first user, and records volume information of the first user. The first terminal also generates an audio file X1 by encoding the collected audio information and the initial accompaniment music file 500, and uploads the audio file X1 and the volume information of the first user to the server.

In the embodiment, the second terminal of the second user downloads the audio file X1 and the volume information of the first user from the server, plays it as an accompaniment music, and prompts the second user to use a same or similar volume of the first user. When the second user sings the second portion 504, the second terminal collects audio information of the second user, and records volume information of the second user. The second terminal further generates an audio file X2 by encoding the collected audio information and the audio file X1 and uploads the audio file X2 and the volume information of the second user to the server.

In the embodiment, the third terminal of the third user downloads the audio file X2 and the volume information of the second user from the server, plays it as an accompaniment music, and prompts the third user to use a same to similar volume of the second user. When the third user sings the third portion 506, the third terminal records volume information of the third user. The third terminal further generates an audio file X3 by encoding the collected audio information and the audio file X2, and uploads the audio file X3 and the volume information of the third user to the server, thereby finishing the whole song.

On the server side, the server marks the first, second, and third portions 502, 504, and 506, respectively, for the initial accompaniment music file 500. For example, the initial accompaniment music file 500 may be marked according to a time interval between characters of lyrics of the song or in other ways, as described above in connection with FIGS. 1 and 2.

Further, the server processes the audio files X1, X2, and X3 uploaded from the first, second, and third terminals, respectively. For example, when the server receives the audio file uploaded from the terminal, the server determines the portion of the received audio file that has been sung according to position information for the collected audio information in the received audio file. The server further marks the received audio file based on the marking of the initial accompaniment music file 500 and the determined sung portion in the received audio file. For example, a different color may be used to mark the determined sung portion of the received audio file; and/or a name of the audio file may be used to indicate the portion that has been sung.

In the above embodiment, the marking of an audio file is accomplished by the server. Alternatively, the marking of an audio file may be accomplished by the terminal that generates the audio file, similar to the above description in connection with FIGS. 3 and 4.

Figure 6:
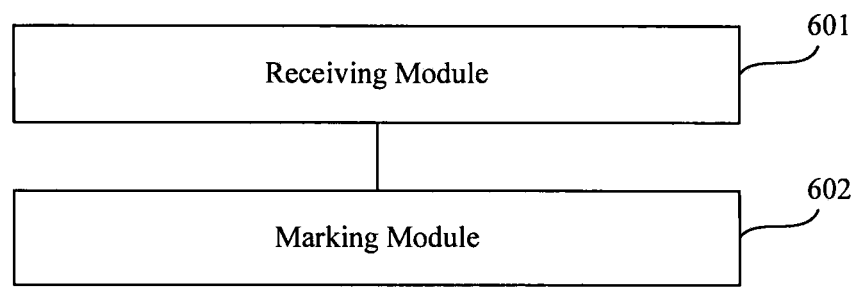
FIGS. 6-9 are block diagrams of devices for recording a song sung by multiple users, according to exemplary embodiments.

FIG. 6 is a block diagram of a device 600 for recording a song sung by multiple users using their respective terminals, according to an exemplary embodiment. For example, the device 600 may be provided as a server. Referring to FIG. 6, the device 600 includes a receiving module 601 configured to receive an audio file uploaded from a terminal that has downloaded a first accompaniment music file, and a marking module 602 configured to mark an unmarked, audio mixing portion in an audio file as a portion that has been sung, to generate a second accompaniment music file.

Figure 7:
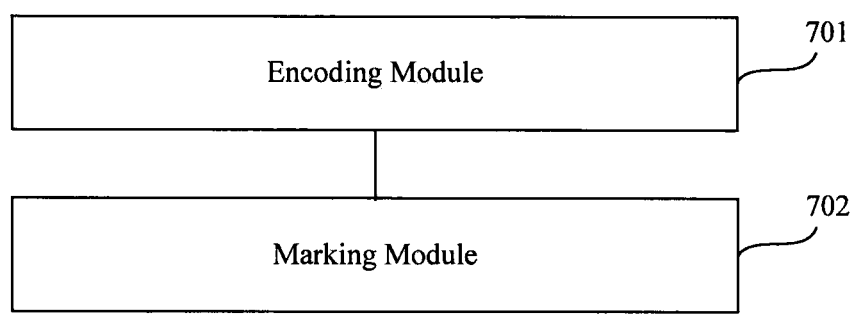

FIG. 7 is a block diagram of a device 700 for recording a song sung by multiple users using their respective terminals, according to an exemplary embodiment. For example, the device 700 may be a first one of the multiple terminals used by a first user. Referring to FIG. 7, the device 700 includes an encoding module 701 configured to collect audio information of the first user singing of a portion of the song, and generate an audio file by encoding the collected audio information and a first accompaniment music file downloaded from a server; and a marking module 702 configured to mark an unmarked, audio mixing portion in the audio file as a portion that has been sung, and upload the marked audio file to the server.

One of ordinary skill in the art will understand that the above described modules can each be implemented by hardware, or software, a combination of hardware and software. One of ordinary skill in the art will also understand that multiple ones of the above described modules may be combined as one module, and each of the above described modules may be further divided into a plurality of sub-modules.

Figure 8:
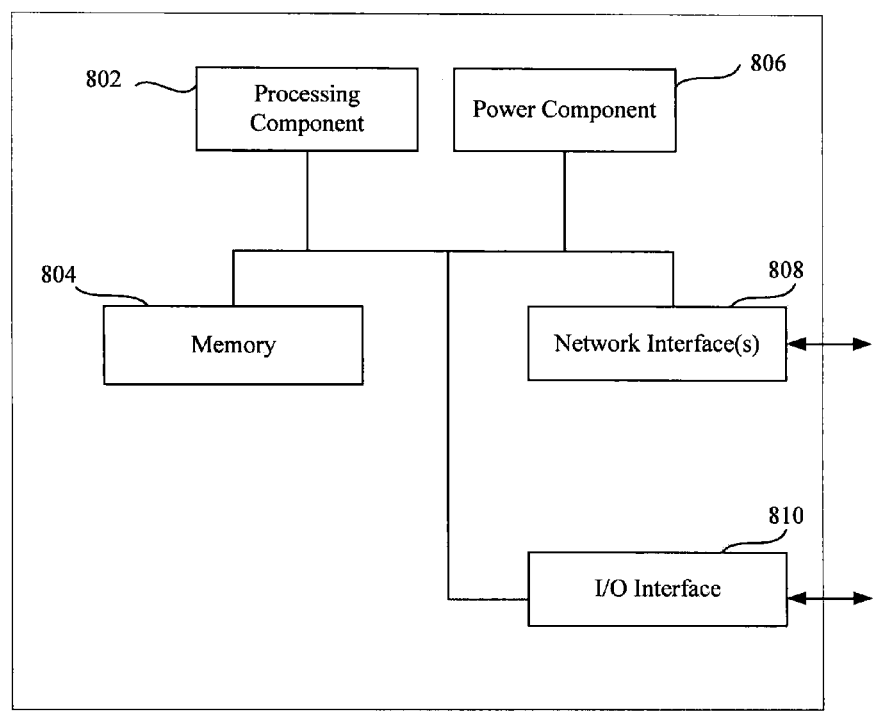

FIG. 8 is a block diagram of a device 800 for recording a song sung by multiple users using their respective terminals, according to an exemplary embodiment. For example, the device 800 may be provided as a server.

Referring to FIG. 8, the device 800 may include a processing component 802 that further includes one or more processors, and memory resources represented by a memory 804 for storing instructions executable by the processing component 802, such as application programs. The application programs stored in the memory 804 may include one or more modules each corresponding to a set of instructions. Further, the processing component 802 is configured to execute the instructions to perform the above described methods.

The device 800 may also include a power component 806 configured to perform power management of the device 800, wired or wireless network interface(s) 808 configured to connect the device 800 to a network, and an input/output (I/O) interface 810. The device 800 may operate based on an operating system stored in the memory 804, such as Windows Server™, Mac OS X™, Unix™, Linux™, FreeBSD™, or the like.

In exemplary embodiments, there is also provided a non-transitory computer-readable storage medium including instructions, such as included in the memory 804, executable by the processor 802 in the device 800, for performing the above-described methods for recording a song sung by multiple users using their respective terminals. For example, the non-transitory computer-readable storage medium may be a ROM, a RAM, a CD-ROM, a magnetic tape, a floppy disc, an optical data storage device, and the like.

Figure 9:
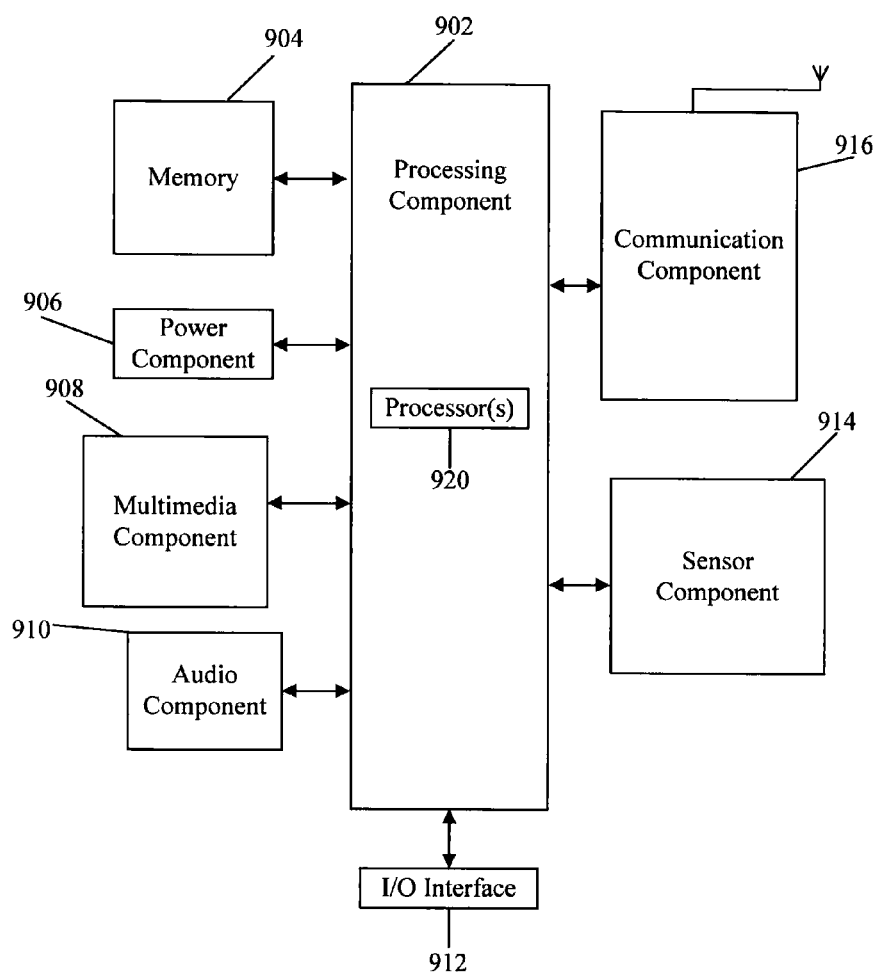

FIG. 9 is a block diagram of a device 900 for recording a song sung by multiple users using their respective terminals, according to an exemplary embodiment. For example, the device 900 may be a first one of the terminals, and may be a mobile terminal, a tablet computer, etc. Referring to FIG. 9, the device 900 may include one or more of the following components: a processing component 902, memory resources represented by a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 performs power management for various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a complementary metal-oxide-semiconductor (CMOS) or charge-coupled device (CCD) image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An audio processing method for use in a server, comprising:
  marking one or more paragraphs for an initial accompaniment music file of a song to generate a first accompaniment music file of the song, wherein the marking of the one or more paragraphs includes:
    obtaining a time interval between every two successive characters of lyrics of the song in the initial accompaniment music file;
    comparing the time interval with a preset threshold value; and
    marking, when the time interval between first and second successive characters of the lyrics is larger than the preset threshold value, an end of a paragraph between the first character and the second character;
  receiving an audio file uploaded from a terminal that has downloaded the first accompaniment music file of the song from the server, the audio file being generated by the terminal by encoding collected audio information relating to singing a portion of the song and the first accompaniment music file; and
  marking an unmarked, audio mixing portion in the received audio file as a portion that has been sung, to generate a second accompaniment music file of the song.

2. The method according to claim 1, wherein the terminal is a first terminal, the method further comprising:
  sending, in response to a request from a second terminal for participating in singing the song, the second accompaniment music file to the second terminal.

3. The method according to claim 2, further comprising:
  receiving from the first terminal volume information relating to the collected audio information; and
  sending the volume information to the second terminal to prompt a user of the second terminal to use a same or similar volume to perform singing.

4. The method according to claim 1, wherein the marking of the unmarked, audio mixing portion in the received audio file comprises:
  obtaining position information for the collected audio information in the audio file;
  identifying the audio mixing portion in the audio file based on the obtained position information, wherein the audio mixing portion is generated by the terminal by encoding the collected audio information and the first accompaniment music file; and
  marking the identified portion in the audio file as the portion that has been sung.

5. The method according to claim 1, wherein the marking of the unmarked, audio mixing portion in the received audio file comprises at least one of:
  changing a color of a portion of the song's lyrics corresponding to the audio mixing portion in the audio file; or
  using a name of the audio file to indicate the audio mixing portion.

6. An audio processing method for use in a terminal, comprising:
  downloading a first accompaniment music file of a song from a server, wherein the server marks one or more paragraphs for an initial accompaniment music file of the song to generate the first accompaniment music file, the marking of the one or more paragraphs including:
    obtaining a time interval between every two successive characters of lyrics of the song in the initial accompaniment music file;
    comparing the time interval with a preset threshold value; and
    marking, when the time interval between first and second successive characters of the lyrics is larger than the preset threshold value, an end of a paragraph between the first character and the second character;
  collecting audio information relating to singing a portion of the song;

encoding the collected audio information and the first accompaniment music file to generate an audio file, the generated audio file including an unmarked, audio mixing portion;
marking the unmarked, audio mixing portion in the audio file as a portion that has been sung; and
uploading the marked audio file to the server.

7. The method according to claim 6, wherein the marking of the unmarked, audio mixing portion in the audio file comprises:
obtaining position information for the collected audio information in the audio file;
identifying the audio mixing portion in the audio file based on the obtained position information; and
marking the identified portion in the audio file as the portion that has been sung.

8. The method according to claim 6, wherein the marking of the unmarked, audio mixing portion in the audio file comprises at least one of:
changing a color of a portion of the song's lyrics corresponding to the audio mixing portion in the audio file; or
using a name of the audio file to indicate the audio mixing portion in the audio file.

9. The method according to claim 6, further comprising:
recording volume information relating to the collected audio information in the audio file; and
uploading the volume information to the server.

10. A server, comprising:
a processor; and
a memory for storing instructions executable by the processor;
wherein the processor is configured to:
mark one or more paragraphs for an initial accompaniment music file of a song to generate a first accompaniment music file of the song, wherein the marking of the one or more paragraphs includes:
obtaining a time interval between every two successive characters of lyrics of the song in the initial accompaniment music file;
comparing the time interval with a preset threshold value; and
marking, when the time interval between first and second successive characters of the lyrics is larger than the preset threshold value, an end of a paragraph between the first character and the second character;
receive an audio file uploaded from a terminal that has downloaded the first accompaniment music file of the song from the server, the audio file being generated by the terminal by encoding collected audio information relating to singing a portion of the song and the first accompaniment music file; and
mark an unmarked, audio mixing portion in the received audio file as a portion that has been sung, to generate a second accompaniment music file of the song.

11. The server according to claim 10, wherein the terminal is a first terminal, the processor being further configured to:
send, in response to a request from a second terminal for participating in singing the song, the second accompaniment music file to the second terminal.

12. The server according to claim 11, the processor being further configured to:
receive from the first terminal volume information relating to the collected audio information; and
send the volume information to the second terminal to prompt a user of the second terminal to use a same or similar volume to perform singing.

13. The server according to claim 10, the processor being further configured to:
obtain position information for the collected audio information in the audio file;
identify the audio mixing portion in the audio file based on the obtained position information, wherein the audio mixing portion is generated by the terminal by encoding the collected audio information and the first accompaniment music file; and
mark the identified portion in the audio file as the portion that has been sung.

14. The server according to claim 10, the processor being further configured to perform at least one of:
changing a color of a portion of the song's lyrics corresponding to the audio mixing portion in the audio file; or
using a name of the audio file to indicate the audio mixing portion.

15. A terminal, comprising:
a processor; and
a memory for storing instructions executable by the processor;
wherein the processor is configured to:
download a first accompaniment music file of a song from a server, wherein the server marks one or more paragraphs for an initial accompaniment music file of the song to generate the first accompaniment music file, the marking of the one or more paragraphs including:
obtaining a time interval between every two successive characters of lyrics of the song in the initial accompaniment music file;
comparing the time interval with a preset threshold value; and
marking, when the time interval between first and second successive characters of the lyrics is larger than the preset threshold value, an end of a paragraph between the first character and the second character;
collect audio information relating to singing a portion of the song;
encode the collected audio information and the first accompaniment music file to generate an audio file, the generated audio file including an unmarked, audio mixing portion;
mark the unmarked, audio mixing portion in the audio file as a portion that has been sung; and
upload the marked audio file to the server.

16. The terminal according to claim 15, the processor being further configured to:
obtain position information for the collected audio information in the audio file;
identify the audio mixing portion in the audio file based on the obtained position information; and
mark the identified portion in the audio file as the portion that has been sung.

17. The terminal according to claim 15, the processor being further configured to perform at least one of:
changing a color of a portion of the song's lyrics corresponding to the audio mixing portion in the audio file; or
using a name of the audio file to indicate the audio mixing portion in the audio file.

18. The terminal according to claim 15, the processor being further configured to:
record volume information relating to the collected audio information in the audio file; and
upload the volume information to the server.

* * * * *